United States Patent [19]

Smits et al.

[11] Patent Number: 5,286,759
[45] Date of Patent: Feb. 15, 1994

[54] FOAMING SYSTEM FOR RIGID URETHANE AND ISOCYANURATE FOAMS

[75] Inventors: Guido F. Smits, Wijnegem, Belgium; Henri J. M. Grünbauer, Oostburg, Netherlands; Johan A. Thoen; Werner A. Lidy, both of Terneuzen, Netherlands

[73] Assignee: The Dow Chemical Company, Midland, Mich.

[21] Appl. No.: 666,825

[22] Filed: Mar. 8, 1991

[51] Int. Cl.$^5$ ............................................ C08G 18/06
[52] U.S. Cl. ............................... 521/131; 521/99; 521/155; 521/161; 521/902
[58] Field of Search ............ 521/98, 133, 131, 902, 521/155, 161, 163

[56] References Cited

U.S. PATENT DOCUMENTS

| | | | |
|---|---|---|---|
| 4,972,002 | 11/1990 | Volkert | 521/120 |
| 4,981,879 | 1/1991 | Snider | 521/131 |
| 5,034,424 | 7/1991 | Wenning | 521/109 |
| 5,035,833 | 7/1991 | Ogawa et al. | 521/98 |

*Primary Examiner*—John Kight, III
*Assistant Examiner*—John M. Cooney, Jr.

[57] ABSTRACT

Polyisocyanate-based foams having a uniformly fine cell size are prepared by reacting a polyisocyanate with an isocyanate-reactive compound in the presence of a blowing agent mixture comprising a hydrocarbon component which has four or more carbon atoms and a polyfluorocarbon component which has a boiling point of from about 283 K. to about 393 K. at 760 mm Hg and wherein the boiling point:molecular weight ratio of said polyfluorocarbon component is less than or equal to 1.7. The hydrocarbon component is present in from about 5 to about 95 mole percent and the polyfluorocarbon in from about 95 to about 5 mole percent based on total amounts of hydrocarbon and polyfluorocarbon.

22 Claims, No Drawings

FOAMING SYSTEM FOR RIGID URETHANE AND ISOCYANURATE FOAMS

FIELD OF THE INVENTION

This invention relates to a foaming system containing a mixture of physical blowing agents and its use in a process of preparing polyurethane or polyisocyanurate foam.

BACKGROUND OF THE INVENTION

Until recently, chlorofluoroalkane-based blowing agents (CFCs) such as CFC-11 ($CCL_3F$) have been the most desirable blowing agents for the preparation of isocyanate-based foams, such as rigid and flexible urethane and isocyanurate foams because of their many advantages including low thermal conductivity, non-flammability of the blowing agent and good dimensional stability of the resulting foam. However, it is becoming increasingly obvious that there may be an association of certain CFCs with the declining ozone concentrations from the earths atmosphere. As a consequence, the use of certain CFCs is being restricted and thus alternative blowing agents are necessary for the preparation of foam.

As a preliminary solution to this problem, hydrogen-containing chlorofluoroalkanes (HCFCs') such as HCFC-123 ($CHCl_2CF_3$) and HCFC-141b ($CH_2ClCHClF$), which have relatively short life times in the atmosphere and essentially decompose before they reach earths' stratosphere containing the ozone, have been proposed. These alternative blowing agents however, present the disadvantages of frequently poorer processing, relatively higher thermal conductivity and often inferior dimensionally stabilities of the resulting foam especially when used in combination with water blowing.

The thermal insulation performance of a foam is dependent principally on the average thermal conductivity of the gas mixture contained within the cells and especially the cell size. Carbon dioxide has a gas thermal conductivity which is significantly greater than that of most "soft" halocarbons and therefore its presence in the gas mixture contained within the cell can be disadvantageous for optimum thermal insulation performance of the foam. With respect to cell size, enhanced thermal insulation performance is generally obtained with a smaller average cell size. Therefore to compensate for any increased average thermal conductivity of the gas that may be contained within the cells of the foam it is desirable to develop new foaming processes which provide for a foam having a fine cell size.

In a recent European Patent publication, EP 351614, fine celled polyurethane foam is prepared in the presence of a blowing agent which is a fluorinated hydrocarbon and/or hexafluorosulphur and being poorly soluble or insoluble in the foam precursor materials. An emulsifying agent, particularly an oligomeric acrylate polyoxyalkylene substance containing fluoroalkane residues is taught as being necessary to provide for resulting foams which do not collapse.

To this purpose of providing a process allowing for the preparation of fine-celled foam we have investigated use of foaming or blowing agent mixtures containing polyfluorocarbon compounds including above mentioned fluorinated hydrocarbons with other physical blowing agents in the preparation of cellular products.

SUMMARY OF THE INVENTION

It has now been discovered that a foaming system comprising a hydrocarbon compound and a polyfluorocarbon compound may be used as the physical blowing agent when preparing polyurethane or polyisocyanurate foam having a uniformly fine cell size.

In one aspect, this invention is a process for preparing a fine, closed-cell, polyisocyanate-based foam by reacting a polyisocyanate with an isocyanate reactive material in the presence of a physical blowing agent wherein the blowing agent comprises a mixture of:

(a) from about 5 to about 95 mole percent, based on components (a) and (b), of a hydrocarbon compound containing four or more carbon atoms; and (b) from about 95 to about 5 mole percent, based on components (a) and (b), of a polyfluorocarbon compound which has a Kelvin boiling point of from about 283 K. to about 393 K. at 760 mm Hg and wherein the ratio of Kelvin boiling point to molecular weight of said polyfluorocarbon compound is less than or equal to 1.7.

In another aspect, this invention is a polyisocyanate-based foam prepared according to the process of the first aspect.

In yet another aspect, this invention is a composition comprising a blend of an isocyanate reactive material and a minor amount of a physical blowing agent as described in the process of the first aspect.

Surprisingly, the use of a combination of a fluorocarbon and hydrocarbon in the defined proportions as blowing agent is found to provide foam having an unexpectedly fine cell structure. A further advantage is that this invention permits the manufacture of foams having a desirable thermal insulation performance especially in consideration of the thermal conductivity of the gas mixture contained within the cells. The individual thermal conductivities of hydrocarbons present in such amounts within a larger sized cell would not normally be considered suitable for conferring desirable thermal insulation properties to the foam. Additionally, this present invention offers the advantage of being able to prepare foams in the absence of stabilizing agents such as disclosed in EP 351,614 without encountering the collapse of the foam.

DETAILED DESCRIPTION OF THE INVENTION

In this invention, a particular blowing agent mixture is used to prepare a fine, closed-cell polyisocyanate-based foam. The blowing agent mixture contains as a first component one or more hydrocarbon compounds containing four or more carbon atoms.

As a second component, the blowing agent mixture contains at least one polyfluorocarbon which is a liquid that has a Kelvin boiling point of from about 283 K. to about 393 K. at 760 mm Hg and wherein the ratio of Kelvin boiling point to molecular weight of said polyfluorocarbon compound is less than or equal to 1.7.

The first component is present in from about 5 to about 95 mole percent of the total moles of the first and second components; the second component is present in from about 95 to about 5 mole percent of the total moles of the first and second components. Preferably, the first component comprises from about 40, more preferably from about 50 mole percent, and up to about 90, more preferably up to about 80, most preferably up to about 75 mole percent of the total moles of the first and second components.

As mentioned, the first component contains one or more hydrocarbon compounds that have four or more carbon atoms and preferably from five to eight carbon atoms. Advantageously for ease of handling within the process of this invention, the atmospheric boiling point of the hydrocarbon compound is from at least 283 K. and up to the temperature attained during the exothermic reaction of preparing the polyisocyanate-based foam. Preferably the boiling point of the hydrocarbon is from about 288 K., and up to about 393 K., more preferably up to about 373 K.

Suitable hydrocarbons include aromatic, alicyclic and especially aliphatic compounds. Exemplary of alicyclic hydrocarbons are include cyclohexane, cyclopentane and such like. Exemplary of the preferred aliphatic hydrocarbon compounds for use in this present invention include pentane, hexane, heptane, octane and isomers thereof. Particularly preferred due to availability are n-pentane, n-hexane, n-heptane and mixtures thereof, with n-pentane being especially preferred. Such hydrocarbons or mixture thereof are readily available commercially and frequently identified as petroleum ethers with a boiling range of, for example, 24–32, 40–65 and 60–95. Hydrocarbon substances available from Exxon including products designated as NORPAR TM 5, NORPAR TM 6 and NORPAR TM 7 are also suitable for use in this invention. Hydrocarbon compounds containing one or more unsaturated carbon-carbon bonds such as alkenes and especially cycloalkenes, for example, cyclopentene and cyclohexene are also suitable for use as the first component of the blowing agent mixture.

As mentioned, the second component of the blowing agent mixture is a polyfluorocarbon which has a Kelvin boiling point of from about 283 K. to about 393 K. at 760 mm Hg. Preferably, the polyfluorocarbon has a boiling point of from about 298 K. and more preferably from about 313 K., and up to about 373 K. The polyfluorocarbon is additionally characterized in that it is sparingly soluble or essentially insoluble in the polyisocyanate or isocyanate-reactive component used to prepare the foam. The extent of the insoluble characteristic can be conveniently expressed in terms of the ratio of Kelvin boiling point: molecular weight. Suitable polyfluorocarbons for use in this present invention may be characterized in that they have a boiling point: molecular weight ratio of 1.7 or less, preferably 1.4 or less, and more preferably 1.1 or less. As this number becomes smaller, the polyfluorocarbon is generally considered as being more insoluble in the components used to prepare polyurethane foam. Numbers greater than 1.7 are generally considered as indicating components which are of at least moderate solubility. Representative of suitable polyfluorocarbon compounds include aromatic aliphatic and alicyclic compounds and particularly polyfluoroalkanes including perfluoroalkanes and polyfluoroethers including perfluoroethers, or mixtures thereof.

Polyfluoroalkanes contemplated for use in this present invention generally meeting the above requirements include those represented by the following general empirical formula:

$C_mH_nF_p$ wherein m is an integer from 3 to 15; n an integer from 0 to 3; and p an integer ranging in value from $2m-n$ to $2m-n+2$. The integer (m) is preferably from 5 to 10, and more preferably from 5 to 8; and integer (n) is preferably 0 or 1. Compounds having fewer or greater numbers of carbon atoms generally do not meet the Kelvin boiling point: molecular weight ratio as identified for the second component.

Polyfluoroether compounds contemplated for use in this present invention generally meeting the above requirements include those represented by the following general empirical formula:

$(C_aH_bF_c)-O-(C_dH_eF_f)$ wherein a and d are both positive integers having a combined total of from 3 to 15, preferably from 3 to 10, and more preferably from 4 to 8; wherein both b and e are positive integers having a combined total of from 0 to 3; and wherein c is an integer defined as being equivalent to $2a+1-b$ and f an integer defined as being equivalent to $2d+1-e$.

Exemplary of polyfluorocarbon compounds include perfluorocyclohexane (Kelvin boiling point: molecular weight ratio; 1.08), perfluoromethylcyclohexane (0.99), perfluorotoluene (1.59), perfluoropentane (1.05), perfluoro-n-pentane (0.98), perfluoro-n-hexane (0.976), perfluoro-2-methylpentane (0.97), perfluoro-3-methylpentane (0.97), perfluoro-2,3-dimethylbutane (0.98), perfluoro-n-heptane (0.91), perfluoro-n-octane (0.89); and hydrogen-containing analogues of the above containing a maximum of three hydrogen atoms and or mixtures thereof. Suitable commercially available polyfluoroalkanes and polyfluoroethers are sold by Rhone-Poulenc under the trademark FLUTEC TM and include products designated as FLUTEC PP50, FLUTEC PP1C, FLUTEC PP1, FLUTEC PP2 and FLUTEC PP3; by 3M under the trademark FLUORINERT TM and include products designated as FLUORINERT 72, FLUORINERT 77, FLUORINERT 84, FLUORINERT 104, FLUORINERT 75; and by Monteflos under the trademark GALDEN TM and include the product designated as GALDEN D/80.

For comparison, the Kelvin boiling point: molecular weight ratio of some conventional physical blowing agents frequently used in preparation of polyurethane foam include n-pentane (4.28), carbon dioxide (4.42), trichlorofluoromethane (2.16), chlorodifluoromethane (2.67), dichlorodifluoromethane (2.0), dichlorotrifluoroethane (1.96), dichlorofluoroethane (2.6) and tetrafluoroethane (2.42).

Exemplary of preferred mixtures for use in the present invention are wherein component (a) is one or more selected from the group consisting of pentane, hexane, heptane, octane and isomers thereof; and component(b) is one or more selected from the group consisting of perfluoropentane, perfluorohexane, perfluoroheptane, perfluorooctane, there monohydrogen-containing equivalents, and mixtures thereof.

Optionally and advantageously to enhance the processability of the polyurethane-forming systems, the blowing agent mixture of this invention further comprises a third component. The third component is a substance, different from the hereinabove described first and second components. The third component can be characterized in that it has a boiling point of from about 200 K. to about 393 K. at 760 mm Hg. When the boiling point of the third component is 283 K. or greater then the third component, is distinguished from the second component in that it, has a Kelvin boiling point-:molecular weight ratio of greater than 1.7, preferably 1.9 or greater, and more preferably 2.1 or greater. When the third component has a boiling point of less than 283 K. then it may have a Kelvin boiling point:molecular weight ratio which is either greater than, or less than 1.7.

When present, the third component constitutes from about 2 to about 70 mole percent based on total moles of first, second and third components present in the mixture. Preferably, the third component constitutes from about 5, more preferably from about 10, and most preferably from about 20, and up to about 60, more preferably up to about 55 and most preferably up to about 40 mole percent based on total moles of first, second and third components present in the mixture. Generally, as the boiling point of the third component becomes lower it may be present in smaller amounts within the blowing agent mixture to obtain a beneficial influence.

Any substance meeting the above requirement for the third component is suitable for use in the present invention Representative substances include halocarbons, ethers, ketones, esters, silanes including, for example, tetramethylsilane and tetrafluorosilane, and such like compounds which are essentially inert under the reaction conditions used to prepare the foam. Particularly suitable substances are organic compounds including halocarbon compounds and especially chlorofluorocarbon, chlorocarbon and fluorocarbon compounds.

Suitable halocarbons may be subdivided into two groups by consideration of their atmospheric boiling point. A first group comprising halocarbon compounds which are essentially liquid at ambient conditions and have a Kelvin boiling point of from 283 K. to about 393 K. and preferably from about 293 K. to about 373 K. at 760 mm Hg. And a second group, comprising halocarbon compounds which are essentially gaseous at ambient conditions and have a Kelvin boiling point of from about 200 K. to about 283 K., preferably from about 220 to about 283 K. and more preferably from about 230 K. to about 273 K. at 760 mm Hg. The selection of the halocarbon group is largely dependent on the type of foaming equipment available and its ability to handle components of differing boiling point. When it is desired to operate a process where advantage is taken of the viscosity reduction potential of the third component then it is of advantage to select a substance of the first group. Use of a component selected from the second group is advantageous where it is desired to obtain a foam with a particularly fine cell structure.

Exemplary of halocarbon compounds comprising the first group include dichlorotrifluoroethane (boiling point 300 K.; b.p./m.wt., 1.96), dichlorofluoroethane (305 K.; 2.61), 1,1,1-trichloroethane (347 K.; 2.60), dichloromethane (313 K.; 3.68), trichlorofluoromethane (296 K.; 2.16), 1,2,2-trichlorofluoroethane (376 K.; 2.48), mixtures thereof, and such like. Preferred due to availability and for environmental reasons are dichlorofluoroethane and dichlorotrifluoroethane.

Exemplary of halogen-containing compounds comprising the second group include tetrafluoroethane (247 K.; 2.42), chlorotetrafluoroethane (261 K.; 1.91), pentafluoroethane (225 K.; 1.87), chlorodifluoroethane (263 K.; 2.62), chlorotrifluoroethane (225 K.; 2.69), difluoroethane (248 K.; 3.76), chlorodifluoromethane (232 K.; 2.68), dichlorodifluoromethane (243 K.; 2.0), heptafluoropentane (256 K.; 1.50), perfluoropropane (237 K.; 1.26), perfluorobutane (271 K.; 1.14), perfluorocyclobutane (267 K.; 1.35), hexafluorosulphur (209 K.; 1.43), mixtures thereof and such like. Preferred due to availability and for environmental reasons are tetrafluoroethane, chlorodifluoroethane, heptafluoropropane (sometimes referred to as monohydrogen-perfluoropropane), perfluoropropane, perfluorobutane, perfluorocyclobutane and chlorodifluoromethane.

Preferred "ternary" foaming systems for use in this present invention are where component (a) is one or more selected from the group consisting of pentane, hexane, heptane, octane and isomers thereof; component (b) is one or more selected from the group consisting of perfluoropentane, perfluorohexane, perfluoroheptane, perfluorooctane and there monohydrogen-containing equivalents; and where component (c) is one or more selected from the group consisting of dichlorofluoroethane, dichlorotrifluoroethane, tetrafluoroethane, perfluoropropane, perfluorobutane, perfluorocyclobutane, chlorodifluoroethane and chlorodifluoromethane.

In making fine celled polyisocyanate-based foams by the process of this invention, a polyisocyanate is intimately mixed under reactive conditions with at least one isocyanate-reactive compound in the presence of the blowing agent mixture of this invention. It is often convenient to preblend the blowing agent mixture of this invention with the isocyanate-reactive compound before contacting same with the polyisocyanate. It is however, possible to blend the polyisocyanate, isocyanate-reactive compound and blowing agent simultaneously in the production of foam, or alternative blend the blowing agent mixture with the polyisocyanate before contacting same with the isocyanate-reactive compound. It is advantageous to employ sufficient amounts of blowing agent to provide a polymer having an overall density of from about 10 to about 700, preferably about 10 to about 300, more preferably about 10 to about 100 kg/m$^3$.

Isocyanate-reactive compounds which are useful in the preparation of polyisocyanate-based foam include those materials or mixtures generally having an average of two or more groups which contain an isocyanate-reactive hydrogen atom, such as are described in U.S. Pat. No. 4,394,491, incorporated herein by reference. Preferred among such compounds are materials where the isocyanate-reactive hydrogen atom is associated with a hydroxyl, primary or secondary amine, carboxylic acid, or thiol groups. Polyols, i.e., compounds having from at least two hydroxyl groups per molecule, are especially preferred due to their desirable reactivity with polyisocyanates. Materials having only one isocyanate-reactive hydrogen atom such as, for example, a (polyether)monoalcohol or a may also be present in small amounts when preparing a polyisocyanate-based foam.

When preparing rigid polyurethane or polyisocyanurate foam, suitable isocyanate reactive materials are those substances typically having an isocyanate-reactive hydrogen atom equivalent weight of from about 50 to about 700, preferably from about 70 to about 300 and more preferably from about 70 to about 150. Such isocyanate-reactive materials also advantageously contain at least 2, preferably from about 3, and up to about 16, preferably up to about 8 isocyanate-reactive hydrogen atoms per molecule. Representative of such isocyanate-reactive materials include polyether polyols, polyester polyols, polyhydroxy-terminated acetal resins, hydroxyl-terminated amines and polyamines, and the like. Examples of these and other suitable isocyanate-reactive materials are described more fully in U.S. Pat. No. 4,394,491, particularly in columns 3–5 thereof, the teachings of which are herein incorporated by reference. Most preferred for preparing rigid foams, on the basis of performance, availability and cost, is a polyol prepared by adding an alkylene oxide to an initiator having from about 2 to about 8, preferably about 3 to about 8 active hydrogen atoms. Exemplary of suitable commercially available polyols are those sold under the trademark VORANOL by The Dow Chemical Company. and include products designated as VORANOL 202, VORANOL 360, VORANOL 370, VORANOL 446, VORANOL 490, VORANOL 575, VORANOL 800 and VORANOL 640. Other preferred polyols include alkylene oxide derivatives of Mannich condensates, as taught, for example, in U.S. Pat. Nos. 3,297,597, 4,137,265 and 4,383,102, incorporated herein by reference; and aminoalkylpiperazine-initiated polyethers as described in U.S. Pat. Nos. 4,704,410 and 4,704,411, incorporated herein by reference.

Polyisocyanates useful in making polyurethanes include aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl-2,4-phenyldiisocyanate, diphenylmethane-4,4'-diisocyanate, diphenylmethane-2,4'-diisocyanate, 4,4'-biphenylenediisocyanate, 3,3'-dimethoxy-4,4'-biphenylenediisocyanate and 3,3'-dimethyldiphenylpropane-4,4'-diisocyanate; triisocyanates such as toluene-2,4,6-triisocyanate and polyisocyanates such as 4,4'-dimethyldiphenylmethane-2,2',5,5'-tetraisocyanate and the diverse polymethylenepolyphenylpolyisocyanates. A crude polyisocyanate may also be used in the practice of this invention, such as the crude toluene diisocyanate obtained by the phosgenation of a mixture of toluene diamines or the crude diphenylmethane diisocyanate obtained by the phosgenation of crude diphenylmethanediamine. The preferred undistilled or crude polyisocyanates are disclosed in U.S. Pat. No. 3,215,652, incorporated by reference. Especially preferred for use in this invention are methylene-bridged polyphenylpolyisocyanates, due to their ability to crosslink the polyurethane.

In the process of preparing the polyurethane and/or polyisocyanurate foam the isocyanate index, ratio of equivalents of isocyanate to equivalents of active hydrogen atoms, is advantageously from about 0.7 to about 5, preferably about 0.8 to about 4 and more preferably about 0.9 to about 1.5.

In addition to the foregoing critical components, optionally and advantageously certain other ingredients are present when preparing the polyisocyanate-based foam. Among these additional ingredients are water, catalysts, surfactants, flame retardants, preservatives, colorants, antioxidants, reinforcing agents, fillers, and the like.

Particularly, it has been found that when water is present the stability of the polyfluorocarbon component generally present as an emulsion in the isocyanate-reactive compound is enhanced as is the dimensional stability of the foam obtained from the process. Additionally, water acts as a blowing agent precursor providing carbon dioxide through reaction with isocyanate. When present, the amount of water advantageously is from at least 2.0 parts by weight per 100 parts by weight of total isocyanate-reactive compound. Preferably, the water is present in amounts of from about 2.2, more preferably from about 2.5 and most preferably from about 2.7 and up to about 10, more preferably up to about 6 and most preferably up to about 5 parts by weight.

When preparing polyurethane foam, it is generally highly preferred to employ a minor amount of a surfactant to stabilize the foaming reaction mixture until it cures. Such surfactants advantageously comprise a liquid or solid organosilicone surfactant. Other, less preferred surfactants include polyethylene glycol ethers of long chain alcohols, tertiary amine or alkanolamine salts of long chain alkyl acid sulfate esters, alkyl sulfonic esters and alkyl arylsulfonic acids. Suitable surfactants for use in this present invention include those described in patent publications U.S. Pat. No. 4,529,743, U.S. Pat. No. 3,637,541 and DE 14 95 927, incorporated herein by reference. Such surfactants are employed in amounts sufficient to stabilize the foaming reaction mixture against collapse and the formation of large, uneven cells. The required amounts, should be established experimentally but, typically are from about 0.5 to about 5, and preferably from about 1, and more preferably from about 1.5 parts of the surfactant per 100 parts by weight polyol. If insufficient amounts of surfactant are present the occurrence of foam collapse and/or formation of large unevenly distributed and/or sized cells may be observed. Representative of commercially available surfactants for use in this present invention include products sold by Th Goldschmidt under the trademark TEGOSTAB and designated as TEGOSTAB B-1048, TEGOSTAB B-1049 and TEGOSTAB BF-2270.

One or more catalysts for promoting the reaction of polyol and water with the polyisocyanate are advantageously used. Any suitable urethane catalyst may be used, including tertiary amine compounds and organometallic compounds. Exemplary tertiary amine compounds include triethylenediamine, N-methyl morpholine, 3-methoxy-N- dimethylpropylamine, pentamethyl-diethylenetriamine, N-coco morpholine, 1-methyl-4-dimethylaminoethylpiperazine, tetramethylethylenediamine, N-ethyl morpholine, diethylethanolamine, N,N-dimethyl-N',N'-dimethyl isopropylpropylenediamine, N,N-diethyl-3-diethylaminopropylamine, dimethylbenzylamine and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, such as an alkali metal alkoxide, alkali metal carboxylate or quaternary amine compound may also optionally be employed herein. Such catalysts are used in an amount which increases the rate of reaction of the polyisocyanate. Typically, depending on the relative activity of the catalyst they are used in amounts of from about 0.01 to about 3, and preferably from about 0.001 to about 2 parts of catalyst per 100 parts by weight of polyol.

In making a polyurethane foam, the polyol(s), polyisocyanate and other components are contacted, thoroughly mixed and permitted to expand and cure into a cellular polymer. The particular mixing apparatus is not critical, and various types of mixing head and spray apparatus are conveniently used. It is often convenient, but not necessary, to preblend certain of the raw materials prior to reacting the polyisocyanate and active hydrogen-containing components. For example, it is often useful to blend the polyol(s), blowing agent, surfactants, catalysts and other components except for polyisocyanates, and then contact this mixture with the polyisocyanate. Alternatively, all components can be introduced individually to the mixing zone where the polyisocyanate and polyol(s) are contacted. It is also possible to pre-react all or a portion of the polyol(s) with the polyisocyanate to form a prepolymer. Further, it is also possible to blend the isocyanate, blowing agent and other non isocyanate-reactive components and then contact this resulting mixture with a polyol.

The second aspect of this present invention relates to a polyisocyanate-based foam prepared in the presence of the above described blowing agent mixture. The foam can be characterized in that it has a fine celled structure. By the term "fine" it is understood that the cells of the foam have an average cell diameter of typically 0.45 millimeters or less, preferably 0.30 millimeters or less, and more preferably 0.25 millimeters or less. Cell diameters of this order can readily be determined using available techniques such as image analysis in combination with an optical microscope.

Additionally, when initially prepared the foam may be characterized in that it contains within its cells, based on amounts of blowing agent present in the foaming process, a gas mixture comprising:

(a) from about 5 to about 90 mole percent, based on components (a) and (b), of carbon dioxide; and (b) from about 95 to about 10 mole percent, based on components (a) and (b) of a physical blowing agent mixture which contains;

(i) from about 5 to about 95 mole percent, based on components (i) and (ii), of a hydrocarbon containing four or more carbon atoms; and (ii) from about 95 to about 5 mole percent, based on components (i) and (ii), of a polyfluorocarbon which has a Kelvin boiling point of from about 283 K. to about 393 K. at 760 mm Hg and wherein the ratio of Kelvin boiling point to molecular weight of said polyfluorocarbon compound is less than or equal to 1.7.

Component (a) of the cell gas mixture, carbon dioxide, is preferably present in from about 15, more preferably from about 30, and most preferably from about 40, and up to about 80, more preferably up to about 70 mole percent based on the total moles present of carbon dioxide and the blowing agent mixture (b).

The carbon dioxide content of the cell is principally obtained through the presence of water in the process of preparing the foam and its reaction with the isocyanate to generate "nascent" carbon dioxide. However, it is also possible to introduce the carbon dioxide directly by entrainment of carbon dioxide gas into the reaction components prior to or during the foaming process or to use alternative chemical sources of carbon dioxide compatible with the polymerizing reaction. Such alternative chemical sources of carbon dioxide include, for example, decomposition of amine/carbon dioxide adducts or generation through the carbodiimidization reaction of isocyanates.

As mentioned hereinabove the physical blowing agent mixture can further comprise a third component. When such a third component is present in the blowing agent mixture the resulting foam contains within its cells a gas mixture comprising carbon dioxide and a physical blowing agent containing commensurate proportions of the first, second and third components. Blowing agent components having a boiling point above ambient temperature are usually in a gaseous phase within the closed cell of the resulting polyisocyanate-based foam as the overall gas pressure within the cell of the fully cured foam is generally significantly less than atmospheric pressure.

The third aspect of this invention relates to a composition comprising a blend of an isocyanate-reactive material and a minor amount of a physical blowing agent mixture which comprises (a) from about 5 to about 95 mole percent, based on components (a) and (b), of a hydrocarbon compound containing four or more carbon atoms; and (b) from about 95 to about 5 mole percent, based on components (a) and (b), of a polyfluorocarbon compound which has a Kelvin boiling point of from about 283 K. to about 393 K. at 760 mm Hg and wherein the ratio of Kelvin boiling point to molecular weight of said polyfluorocarbon compound is less than or equal to 1.7.

By "minor amount" it is understood that the composition contains a sufficient amount of the mixture so that when the composition is used in the preparation of polyisocyanate-based foam, foam of the desired density is obtained. Typically, the amount of mixture present will be from about 1 to about 50, preferably from about 5 to about 30, and more preferably from about 10 to about 30 parts by weight per 100 parts by weight of the isocyanate-reactive material.

Similarly, as mentioned for the first and second aspects the present invention, the physical blowing agent mixture present in the composition can also comprise a third component such as already described and in like proportions as discussed.

For the purpose of this invention, an isocyanate-reactive material is considered to be a substance containing an isocyanate-reactive hydrogen atom(s) such as, for example, a polyether polyol or polyester polyol as described hereinabove.

The polyurethane foam prepared by the process of this invention using the above described blowing agent of this invention is useful in a wide range of applications. Particularly, when the foam prepared according to this invention is a rigid polyurethane it is of value for applications such as spray insulation, appliance foam, rigid insulating boardstock, and laminates.

The following examples are given to illustrate the invention and are not intended to limit the scope thereof. Unless stated otherwise, all parts and percentages are given by weight. A standard polyol formulation is used in the preparation of foams with various blowing agent mixtures according to the invention and contains.

56.7 parts sucrose/glycerine-initiated oxypropylene polyol, OH No. 400

9.0 parts glycerine-PO polyol, OH No 645

6.8 parts ethylenediamine-PO polyol, OH No 640

20.6 parts polyoxypropylene glycol, OH No 56

3.15 parts water 0.8 part N,N-dimethylaminocyclohexane 0.9 part CURITHANE 206, a polyisocyanurate-promoting catalyst available from The Dow Chemical Company 2.0 parts Tegostab B-1048, a silicone surfactant available from Th Goldschmidt Ag.

Blowing Agent to provide for a foam having a free rise density of from about 20 to about 21 kilograms per cubic meter.

Handmix foams are prepared by reacting the above polyol formulation with a crude polymeric polyisocyanate, designated as VORANATE 227 and available from The Dow Chemical Company, at a reaction index of 1.05. The polyol formulation and polyisocyanate are intimately mixed for about 10 seconds using a mixer operating at 3000 rpm, then resulting mixture is poured into a container and allowed to reacted and provide the final polyurethane foam.

Thermal conductivity properties of the foams so obtained are measured at 0 days after preparation in the parallel-to-rise direction using samples having dimensions of approximately 20×20×3 cm. The conductivity is measured using an Anacon Model 88 Thermal Conductivity Analyzer having mean plate temperatures of about 10.2° C. and about 37.8° C. Lower values (mW/M.K) indicate better thermal insulative properties. Aged thermal conductivities as reported are obtained by measuring the thermal conductivity of the same foam sample after storage at ambient temperatures and conditions for 90 days, or other period of time as may be stated.

The average foam cell diameter is determined from a thin section of foam using a polarized-light optical microscope together with a Quantimet 520 Image Analysis system. The accuracy of the measurement is considered to be ±0.02 mm.

The composition of the cell gas mixture as given is that which can be anticipated if there is a full retention of all blowing agents and gases within the initial foam based on types and amounts components present in the reacting mixture.

EXAMPLE 1

Rigid polyurethane foam according to the invention is prepared using a blowing agent mixture wherein Component A is n-hexane and Component B, a fluorinated ether ($C_4H_3F_7O$) b.p. 330 K.,(b.p./m.wt. 1.65). The amounts of the blowing agent components employed, the cell gas composition contained within the cell of the foam as calculated from the amounts of water and blowing agent mixture present, and the properties of the resulting foams are given in Table 1.

TABLE 1

| Foam Sample | Blowing Agent Mixture pbw/mole percent | | Cell gas composition (mole %) | | | Cell Size (mm) | Foam Thermal Conductivity mW/M.K | |
|---|---|---|---|---|---|---|---|---|
| | A. | B. | $CO_2$ | A. | B. | | 0 days | 90 days |
| 1.1 | 1.4/10% | 28.7/90% | 52 | 5 | 43 | 0.40 | 19.6 | 25.8 |
| 1.2 | 4.0/30% | 22.7/70% | 52 | 14 | 34 | 0.38 | 19.8 | 25.8 |
| 1.3 | 6.9/50% | 16.0/50% | 52 | 24 | 24 | 0.39 | 19.8 | 26.6 |
| 1.4 | 9.8/70% | 9.4/30% | 52 | 34 | 14 | 0.44 | 21.3 | 27.2 |
| 1.5 | 12.4/90% | 3.3/10% | 52 | 43 | 5 | 0.41 | 21.7 | 28.8 |

EXAMPLE 2

Rigid polyurethane foam according to the invention is prepared using a blowing agent mixture wherein Component A is n-hexane and Component B, a hydrogen-containing polyfluoroalkane ($C_6HF_{13}$) b.p. 343 K.;(b.p./m.wt. 1.07). The amounts of the blowing agent components employed, the cell gas composition contained within the cell of the foam as calculated from the amounts of water and blowing agent mixture present, and the properties of the resulting foams are given in Table 2.

TABLE 2

| Foam Sample | Blowing Agent Mixture pbw/mole percent | | Cell gas composition (mole %) | | | Cell Size (mm) | Foam Thermal Conductivity (mW/M.K) | |
|---|---|---|---|---|---|---|---|---|
| | A. | B. | $CO_2$ | A. | B. | | 0 days | 90 days |
| 2.1 | 1.4/10% | 45.9/90% | 52 | 5 | 43 | 0.36 | 21.1 | 27.8 |
| 2.2 | 4.0/30% | 36.3/70% | 52 | 14 | 34 | 0.25 | 20.6 | 26.9 |
| 2.3 | 6.9/50% | 25.6/50% | 52 | 24 | 24 | 0.25 | 20.4 | 28.6 |
| 2.4 | 9.8/70% | 15.0/30% | 52 | 34 | 14 | 0.41 | 20.7 | 27.4 |
| 2.5 | 12.4/90% | 5.3/10% | 52 | 43 | 5 | 0.43 | 21.8 | 27.9 |

In this example, optimum cell size reduction is observed when component B is present in the blowing agent mixture in from about 50 to about 70 mole percent.

EXAMPLE 3

Rigid polyurethane foam according to the invention is prepared using a blowing agent mixture wherein Component A is n-hexane and Component B,is a polyfluoroalkane ($C_6F_{14}$)b.p. 330 K.,(b.p./m.wt. 0.97). The amounts of the blowing agent components employed, the cell gas composition contained within the cell of the foam as calculated from the amounts of water and blowing agent mixture present, and the properties of the resulting foams are given in Table 3.

TABLE 3

| Foam Sample | Blowing Agent Mixture pbw/mole percent A. | B. | Cell gas composition (mole %) CO₂ | A. | B. | Cell Size (mm) | Foam Thermal Conductivity (mW/M.K) 0 days | 90 days |
|---|---|---|---|---|---|---|---|---|
| 3.1 | 1.4/10% | 48.8/90% | 52 | 5 | 43 | 0.36 | 29.2 | 30.7 |
| 3.2 | 4.0/30% | 38.6/70% | 52 | 14 | 34 | 0.21 | 25.6 | 29.0 |
| 3.3 | 6.9/50% | 25.5/50% | 52 | 24 | 24 | 0.21 | 18.9 | 23.7 |
| 3.4 | 9.8/70% | 14.9/30% | 52 | 34 | 14 | 0.26 | 19.6 | 25.0 |
| 3.5 | 12.4/90% | 5.3/10% | 52 | 43 | 5 | 0.33 | 20.3 | 26.3 |

When comparing this example to the previous examples it is to be observed that as the Kelvin boiling point:molecular weight ratio of component B becomes smaller, that for a given quantity of component B the observed cell size generally is also smaller.

COMPARATIVE EXAMPLE A

Rigid polyurethane foam is prepared using a blowing agent mixture wherein Component A is n-hexane and Component B, dichlorotrifluoroethane (R-123) b.p. 300 K.,(b.p./m.wt. 1.96). The amounts of the blowing agent components employed, the cell gas composition contained within the cell of the foam as calculated from the amounts of water and blowing agent mixture present, and the properties of the resulting foams are given in Table 4.

TABLE 4

| Foam Sample | Blowing Agent Mixture pbw/mole percent A. | B. | Cell gas composition (mole %) CO₂ | A. | B. | Cell Size (mm) | Foam Thermal Conductivity (mW/M.K) 0 days | 90 days |
|---|---|---|---|---|---|---|---|---|
| A* | 1.4/10% | 20.6/90% | 52 | 5 | 43 | 0.5 | 20.6 | 27.5 |
| B* | 4.0/30% | 16.2/70% | 52 | 14 | 34 | 0.5 | 20.9 | 27.8 |
| C* | 6.9/50% | 11.5/50% | 52 | 24 | 24 | 0.47 | 21.7 | 28.4 |
| D* | 9.8/70% | 6.7/30% | 52 | 34 | 14 | 0.38 | 21.8 | 28.1 |
| E* | 12.4/90% | 2.4/10% | 52 | 43 | 5 | 0.40 | 22.1 | 29.1 |
| F* | 13.8/100% | / | 52 | 48 | / | 0.47 | 22.0 | 30.0 |

*Not an example of this invention

Use of dichlorotrifluoroethane having a Kelvin boiling point:molecular weight ratio greater than 1.7 as comparative component B in the blowing agent mixture does not provide for a fine celled foam of the same order especially when used in equivalent amounts to component B described by this invention.

EXAMPLE 4

Polyurethane foam is prepared using a blowing agent mixture wherein Component A is n-pentane and Component B, a polyfluoroalkane ($C_6F_{14}$) b.p. 330 K.,(b.p./m.wt. 0.97), see Table 5.

TABLE 5

| Foam Sample | Blowing Agent Mixture pbw/mole percent A. | B. | Cell gas composition (mole %) CO₂ | A. | B. | Cell Size (mm) | Foam Thermal Conductivity (mW/M.K) 0 days | 90 days |
|---|---|---|---|---|---|---|---|---|
| 4.1 | 1.2/10% | 48.8/90% | 52 | 5 | 43 | 0.27 | 19.5 | 29.7 |
| 4.2 | 3.3/30% | 38.6/70% | 52 | 14 | 34 | 0.25 | 19.6 | 28.3 |
| 4.3 | 5.8/50% | 25.5/50% | 52 | 24 | 24 | 0.21 | 20.1 | 26.0 |
| 4.4 | 8.2/70% | 14.9/30% | 52 | 34 | 14 | 0.26 | 20.4 | 25.5 |
| 4.5 | 10.4/90% | 5.3/10% | 52 | 43 | 5 | 0.37 | 21.1 | 26.4 |
| G* | 11.6/100% | / | 52 | 48 | / | 0.57 | 22.4 | 27.2 |

*Not an example of this invention

EXAMPLE 5

Polyurethane foam is prepared using a blowing agent mixture wherein Component A is n-heptane and Component B, a polyfluoroalkane ($C_6F_{14}$) b.p. 330 K.,(b.p./m.wt. 0.97), see Table 6.

| Foam Sample | Blowing Agent Mixture pbw/mole percent A. | B. | Cell gas composition (mole %) CO₂ | A. | B. | Cell Size (mm) | Foam Thermal Conductivity (mW/M.K) 0 days |
|---|---|---|---|---|---|---|---|
| 5.1 | 1.6/10% | 48.8/90% | 52 | 5 | 43 | 0.21 | 19.3 |
| 5.2 | 4.7/30% | 38.6/70% | 52 | 14 | 34 | 0.28 | 20.1 |

-continued

| Foam Sample | Blowing Agent Mixture pbw/mole percent | | Cell gas composition (mole %) | | | Cell Size (mm) | Foam Thermal Conductivity (mW/M.K) 0 days |
|---|---|---|---|---|---|---|---|
| | A. | B. | $CO_2$ | A. | B. | | |
| 5.3 | 8.0/50% | 25.5/50% | 52 | 24 | 24 | 0.28 | 19.7 |
| 5.4 | 11.4/70% | 14.9/30% | 52 | 34 | 14 | 0.38 | 22.9 |
| 5.5 | 14.4/90% | 5.3/10% | 52 | 43 | 5 | 0.55 | 24.9 |
| H* | 16.0 | / | 52 | 48 | / | 0.61 | 26.6 |

*Not an example of this invention

By consideration of Example 4 (Table 5) and Example 5 (Table 6), where the same component B is present in the blowing agent mixture, it is to be seen that use of a Component A which a lower boiling point may additionally enhance the ability to obtain foams having a fine cell structure. The boiling points of n-pentane and n-heptane are respectively 36° C. and 980° C.

EXAMPLE 6

Rigid polyurethane foam according to the invention is prepared using a blowing agent mixture wherein Component A is n-pentane and Component B is a commercially available polyfluoroalkane FLUORINERT TM FC-77 b.p. 370 K.,(b.p./m.wt. 0.89). The amounts of the blowing agent components employed, the cell gas composition contained within the cell of the foam as calculated from the amounts of water and blowing agent mixture present, and the properties of the resulting foams are given in Table 7.

TABLE 7

| Foam Sample | Blowing Agent Mixture pbw/mole percent | | Cell gas composition (mole %) | | | Cell Size (mm) | Foam Thermal Conductivity (mW/M.K) |
|---|---|---|---|---|---|---|---|
| | A. | B. | $CO_2$ | A. | B. | | |
| 6.1 | 1.2/10% | 59.5/90% | 52 | 5 | 43 | 0.29 | 24.6 |
| 6.2 | 3.3/30% | 47.1/70% | 52 | 14 | 34 | 0.26 | 22.1 |
| 6.3 | 5.8/50% | 31.1/50% | 52 | 24 | 24 | 0.33 | 21.7 |
| 6.4 | 8.2/70% | 18.2/30% | 52 | 34 | 14 | 0.38 | 21.7 |
| 6.5 | 10.4/90% | 6.5/10% | 52 | 43 | 5 | 0.41 | 21.6 |

EXAMPLE 7

Rigid polyurethane foam according to the invention is prepared using a blowing agent mixture wherein Component A is n-hexane and Component B is a commercially available polyfluoroalkane FLUORINERT TM FC-77 b.p. 370 K.,(b.p./m.wt. 0.89). The amounts of the blowing agent components employed, the cell gas composition contained within the cell of the foam as calculated from the amounts of water and blowing agent mixture present, and the properties of the resulting foams are given in Table 8.

TABLE 8

| Foam Sample | Blowing Agent Mixture pbw/mole percent | | Cell gas composition (mole %) | | | Cell Size (mm) | Foam Thermal Conductivity (mW/M.K) |
|---|---|---|---|---|---|---|---|
| | A. | B. | $CO_2$ | A. | B. | | |
| 7.1 | 1.4/10% | 59.5/90% | 52 | 5 | 43 | 0.38 | 23.7 |
| 7.2 | 4.0/30% | 47.1/70% | 52 | 14 | 34 | 0.26 | 22.1 |
| 7.3 | 6.9/50% | 31.1/50% | 52 | 24 | 24 | 0.38 | 20.6 |
| 7.4 | 9.8/70% | 18.2/30% | 52 | 34 | 14 | 0.36 | 20.9 |
| 7.5 | 12.4/90% | 6.5/10% | 52 | 43 | 5 | / | / |

Study of Examples 6 and 7 illustrates that optimum concentrations of components A and B vary depending on the specific combination of compounds employed.

EXAMPLE 8

Rigid polyurethane foam according to the invention is prepared with varying amounts of water to provide for a different carbon dioxide concentration in the cell gas. Water is used in amounts of 0.61, 1.82, 3.04, and 4.86 parts by weight to provide foams having an overall carbon dioxide cell gas concentration of respectively 10, 30, 50 and 80 mole percent. The blowing agent mixture used contains as Component A, n-hexane and as Component B, a polyfluoroalkane ($C_6F_{14}$) b.p. 330 K.,(b.p./m.wt. 0.97). The properties of the resulting foams are given in Table 9.

TABLE 9

| Foam Sample | Blowing Agent Mixture pbw/mole percent | | Cell gas composition (mole %) | | | Cell Size (mm) | Foam Thermal Conductivity (mW/M.K) |
|---|---|---|---|---|---|---|---|
| | A. | B. | $CO_2$ | A. | B. | | |
| 8.1 | 6.2/50 | 24.5/50 | 10 | 45 | 45 | 0.3 | 21.9 |
| 8.2 | 6.9/70 | 10.9/30 | 30 | 50 | 20 | 0.29 | 20.6 |
| 8.3 | 4.8/50 | 19.0/50 | 30 | 35 | 35 | 0.20 | 19.9 |
| 8.4 | 2.8/30 | 27.2/70 | 30 | 20 | 50 | 0.19 | 20.7 |
| 8.5 | 6.9/50 | 25/50 | 50 | 25 | 25 | 0.29 | 19.1 |
| 8.6 | 1.4/50 | 5.4/50 | 80 | 10 | 10 | 0.20 | 20.1 |

TABLE 9-continued

| Foam Sample | Blowing Agent Mixture pbw/mole percent A. | B. | Cell gas composition (mole %) $CO_2$ | A. | B. | Cell Size (mm) | Foam Thermal Conductivity (mW/M.K) |
|---|---|---|---|---|---|---|---|
| I* | 9.7/100 | — | 30 | 70 | / | 0.53 | 23.8 |
| J* | 11.0/100 | — | 80 | 20 | / | 0.35 | 22.2 |

*Not an example of this invention

The reported data illustrates the possibility of preparing foams according to this invention which can contain within there cells a high level of carbon dioxide and yet display attractive thermal insulation performance.

EXAMPLE 9

Rigid polyurethane foam according to the invention is prepared using a foaming system wherein component A is n-hexane; component B a polyfluoroalkane ($C_6F_{14}$) (b.p.:m.wt. 0.97); and further comprising an additional component C, dichlorofluoroethane b.p. 305 K. (b.p.:m.wt., 2.61).

The standard polyol formulation as used for the preceeding examples is modified to contain water in amounts of from 0.61, 1.22, 1.82, 3.04, and 4.86 parts so providing for foam having a calculated carbon dioxide cell gas content, based on amounts of water and physical blowing agent present, of respectively, 10, 20, 30, 50 and 80 mole percent. Properties of the resulting foams are given in Table 10.

95 parts polyoxypropylene-oxyethylene(50:50) adduct of a phenol/formaldehyde condensate having hydroxyl number of 224

5 parts polyoxypropylene glycol, OH No 56

10 parts Tegostab B-1048, a silicone surfactant available from Th Goldschmidt Ag.

0.6 part N,N-dimethylaminocyclohexane 0.3 part pentamethylethylenediamine 2.45 parts water 94.4 parts VORANATE 220 a crude polymeric polyisocyanate available from The Dow Chemical Company.

A ternary physical blowing agent mixture as defined in the following table is employed. Component A (33 mole percent of the total blowing agent mixture) of the mixture is n-hexane; Component B (33 mole percent)is a product designated as FLUTEC PP1C sold by Rhone-Poulenc and believed to be perfluoromethylcyclopentane (b.p. 321 K., b.p.:m.wt; 1.07; and component C (33 mole percent) is as given in Table 11. Some properties

TABLE 10

| Foam Sample | Blowing Agent Mixture pbw/mole percent A. | B. | C. | Density (Kg/M³) | Cell gas composition (mole %) $CO_2$ | A. | B. | C. | Cell Size (mm) | Foam Thermal Conductivity mW/M.K Initial | Aged 65 days |
|---|---|---|---|---|---|---|---|---|---|---|---|
| 9.1 | 25 | 25 | 50 | 40 | 20 | 20 | 20 | 40 | 0.21 | 19.3 | 24.6 |
| 9.2 | 25 | 37.5 | 37.5 | 31 | 20 | 20 | 30 | 30 | 0.24 | 18.8 | 22.8 |
| 9.3 | 15 | 15 | 70 | 28.5 | 30 | 10 | 10 | 50 | 0.24 | 18.3 | 24.5 |
| 9.4 | 20 | 20 | 60 | 26.3 | 50 | 10 | 10 | 30 | 0.19 | 19.0 | 26.3 |
| K* | 50 | 50 | / | 33 | 10 | 45 | 45 | / | 0.30 | 21.9 | 24.4 |
| L* | 70 | 30 | / | 35.0 | 30 | 50 | 20 | / | 0.29 | 20.6 | 25.6 |
| M* | 100 | / | / | 33 | 30 | 70 | / | / | 0.53 | 23.8 | 31.5 |
| N* | / | 100 | / | 24 | 30 | / | 70 | / | 0.26 | 26.5 | 32.7 |
| O* | / | / | 100 | 22 | 30 | / | / | 70 | 0.60 | 19.9 | N.D. |

*Not an example of this invention
N.D.—Not determined

EXAMPLE 10 of resulting molded foams are also shown in Table 11.

TABLE 11

| Foam Sample | Component C name | b.p.:m. wt. | Cell gas composition (mole %) $CO_2$ | A. | B. | C. | Cell Size (mm) | Foam Thermal Conductivity mW/M.K | Compressive Strength (kPa) parallel-to-rise/ perpendicular-to-rise |
|---|---|---|---|---|---|---|---|---|---|
| 10.1 | trichlorofluoromethane | 2.16 | 40 | 20 | 20 | 20 | 0.16 | 18.4 | 69/45 |
| 10.2 | chlorodifluoroethane | 2.62 | 40 | 20 | 20 | 20 | 0.16 | 18.4 | 86/65 |
| 10.3 | tetrafluoroethane | 2.42 | 40 | 20 | 20 | 20 | 0.13 | 18.2 | 96/52 |
| 10.4 | dichlorodifluoromethane | 2.0 | 40 | 20 | 20 | 20 | 0.13 | 17.8 | 120/61 |
| 10.5 | chlorodifluoromethane | 2.68 | 40 | 20 | 20 | 20 | 0.14 | 18.2 | 94/53 |
| P* | trichlorofluoromethane | 2.16 | 40 | 20 | / | 40 | 0.29 | 18.8 | 73/48 |

*Not an example of this invention

Handmix polyurethane foams having a free-rise density of approximately 21 kilograms per cubic meter and when molded of approximately 30 kilograms per cubic meter are prepared according to this invention using the polyol formulation given below

EXAMPLE 11

In this example a polyurethane foam is from the standard formulation as used for Examples 1 to 9, but modified to additionally contain 2 parts by weight of a surfactant, TEGOSTAB B-2219 available from Th Goldschmidt Ag. The foam is prepared using a low pressure mixing and dispensing unit in the presence of a physical blowing agent mixture which contains as, Component A(48 mole %) n-pentane; Component B(48 mole %) a product designated as FLUTEC PP50 sold by Rhone-Poulenc and believed to be perfluoro-n-pentane (b.p. 302 K.; b.p.:m.wt., 1.05); Component C (2 mole %) heptafluoropropane (b.p. 256 K.; b.p.:m.wt., 1.5). The properties of so obtained foam, having a cell gas composition of carbon dioxide 50%; Component A 24%; Component B 24%; Component C 1%, are given in Table 12.

TABLE 12

| Foam Property | Foam Sample 11.1 | Foam Sample 11.2 | Foam Sample 11.3 |
|---|---|---|---|
| Density (Kg/m$^3$) | 21 1 | 30 2 | 35 2 |
| Compressive Strength (kPa) | | | |
| parallel-to-rise | 87 | 99 | 107 |
| perpendicular-to-rise | 39 | 69 | 82 |
| Foam Thermal Conductivity ((mW/M.K)) | | | |
| 0 day | / | 18.6 | 18.7 |
| 12 days | 20.4 | 20.1 | 20.5 |
| Cell Size (mm) | 0.13 | / | 0.12 |

1 - free rise density
2 - molded density

Comparing the data presented for Example 11 to the that of the preceding Examples, particularly Examples 9 and 10, clearly shows the benefice to be obtained by using in relative small amounts a component C which has a boiling point of less than 283 K. and a boiling point:molecular weight ratio of less than 1.7.

What is claimed is:

1. A process for preparing a fine, closed-cell, polyisocyanate-based foam by reacting a polyisocyanate with an isocyanate reactive material in the presence of water and a physical blowing agent, wherein the blowing agent comprises a mixture of:
   (a) from about 5 to about 95 mole percent, based on components (a) and (b), of a hydrocarbon compound containing four or more carbon atoms;
   (b) from about 95 to about 5 mole percent, based on components (a) and (b), of a polyfluorocarbon compound which has a Kelvin boiling point of from about 283 K. to about 293 K. at 760 mm Hg and wherein the ratio of Kelvin boiling point to molecular weight of said polyfluorocarbon compound is less than or equal to 1.7; and
   (c) from about 2 to about 70 mole percent based on total moles of components (a), (b) and (c) present, and wherein (c) is a substance, different from (a) or (b), which has a boiling point of from about 200 K. to about 393 K. at 760 mm Hg and when the boiling point is 283 K. or greater a Kelvin boiling point to molecular weight ratio of greater than 1.7, and wherein the water is present in at least 2 parts by weight per 100 parts isocyanate reactive material.

2. The process of claim 1 wherein component (a) is present in from about 40 to about 90 mole percent, and wherein component (b) is present in from about 10 to about 60 mole percent based on components (a) and (b).

3. The process of claim 2 wherein component (a) is present in from about 50 to about 80 mole percent, and wherein component (b) is present in from about 20 to about 50 mole percent based on components (a) and (b).

4. The process of claim 1 wherein the polyfluorocarbon has a Kelvin boiling point of from about 283 K. to about 373 K.

5. The process of claim 1 wherein the polyfluorocarbon is a polyfluoroether, a polyfluoroalkane, a perfluoroether, a perfluoroalkane or mixtures thereof.

6. The process of claim 5 wherein the polyfluorocarbon has from 5 to 8 carbon atoms.

7. The process of claim 6 wherein the polyfluoroalkane is one or more selected from the group consisting of perfluoropentane, perfluorohexane, perfluoroheptane, perfluorooctane and there monohydrogen-containing equivalents.

8. The process of claim 1 wherein component (a) is a $C_{5-8}$ hydrocarbon compound.

9. The process of claim 1 wherein (a) is a $C_{5-8}$ hydrocarbon compound, and (b) a polyfluoroether, a polyfluoroalkane, a perfluoroether, a perfluoroalkane or mixtures thereof.

10. The process of claim 9 wherein (a) is
    one or more $C_{5-8}$ hydrocarbon compounds selected from the group consisting of pentane, hexane, heptane, octane and isomers thereof; and wherein (b) is one or more polyfluorocarbon compounds selected from the group consisting of perfluoropentane, perfluorohexane, perfluoroheptane, perfluorooctane and their monohydrogen-containing equivalents.

11. The process of claim 1 wherein (b) has Kelvin boiling point to molecular weight ratio of 1.5 or less.

12. The process of claim 1 wherein (c) is present in from about 10 to about 40 mole percent based on total moles of (a), (b) and (e) present.

13. The process of claim 1 wherein (c) is a halocarbon and comprises a chlorocarbon, a chlorofluorocarbon, a fluorocarbon or mixtures thereof.

14. The process of claim 13 wherein (c) has a Kelvin boiling point of from about 200 K. to about 283 K..

15. The process of claim 14 wherein (c) is tetrafluoroethane, chlorodifluoroethane, chlorodifluoromethane, dichlorodifluoromethane, heptafluoropropane, perfluoropropane, perfluorobutane, perfluorocyclobutane or mixtures thereof.

16. The process of claim 13 wherein (c) has a Kelvin boiling point of from about 283 K. to about 393 K. and a Kelvin boiling point to molecular weight ratio of 1.9 or greater.

17. The process of claim 16 wherein (c) is dichlorotrifluoroethane, dichlorofluoroethane, trichloroethane, trichlorofluoromethane or mixtures thereof.

18. The process of claim 14 wherein the foaming agent comprises a mixture of:
    (a) from about 5 to about 95 mole percent, based on components (a) and (b), of one or more $C_{5-8}$ hydrocarbon compounds selected from the group consisting of pentane, hexane, heptane, octane and isomers thereof;
    (b) from about 95 to about 5 mole percent, based on components (a) and (b), of one or more polyfluorocarbon compounds selected from the group consisting of perfluoropentane, perfluorohexane, perfluoroheptane, perfluorooctane and there monohydrogen-containing equivalents; and
    (c) from about 2 to about 70 mole percent based on components (a), (b) and (c), of one or more organic compounds selected from the group consisting of tetrafluoroethane, chlorodifluoroethane, heptafluoropropane, perfluoropropane, perfluorobutane, perfluorocyclobutane, chlorodifluoromethane and dichlorodifluoromethane.

19. The process of claim 16 wherein the foaming agent comprises a mixture of:
   (a) from about 5 to about 95 mole percent, based on components (a) and (b), of one or more $C_{5-8}$ hydrocarbon compounds selected from the group consisting of pentane, hexane, heptane, octane and isomers thereof;
   (b) from about 95 to about 5 mole percent, based on components (a) and (b), of one or more polyfluorocarbon compounds selected from the group consisting of perfluoropentane, perfluorohexane, perfluoroheptane, perfluorooctane and there monohydrogen-containing equivalents; and
   (c) from about 2 to about 70 mole percent based on components (a), (b) and (c), of one or more organic compounds selected from the group consisting of dichlorotrifluoroethane, dichlorofluoroethane, trichloroethane and trichlorofluoromethane.

20. The fine, closed-cell polyisocyanate-based foam prepared according to the process of claim 1.

21. The foam of claim 20 having an average density of from about 10 to about 100 $Kg/M^3$ and a mean cell diameter of 0.45 mm or less.

22. A composition comprising a blend of an isocyanate-reactive material, water and a minor amount of a physical blowing agent which comprises:
   (a) from about 5 to about 95 mole percent, based on components (a) and (b), of a hydrocarbon compound containing four or more carbon atoms;
   (b) from about 95 to about 5 mole percent, based on components (a) and (b), of a polyfluorocarbon compound which has a Kelvin boiling point of from about 283 K. to about 393 K. at 760 mm Hg and wherein the ratio of Kelvin boiling point to molecular weight of said polyfluorocarbon compound is less than or equal to 1.7; and
   (c) from about 2 to about 70 mole percent, based on total moles of components (a), (b) and (c) present, of a substance, different from (a) or (b), which has a boiling point of from about 200 K. to about 393 K. at 760 mm Hg and, when the boiling point is 283 K. or greater, a Kelvin boiling point to molecular weight ratio of greater than 1.7, and wherein the water is present in at least 2 parts by weight per 100 parts isocyanate reactive material.

* * * * *